(12) United States Patent
Chen

(10) Patent No.: US 6,530,540 B1
(45) Date of Patent: Mar. 11, 2003

(54) FLAPPING-WING FLYING DEVICE

(76) Inventor: Shane Chen, 1821 NW. 8th Ave., Camas, WA (US) 98607

( * ) Notice: Subject to any disclaimer, the term of this patent is extended or adjusted under 35 U.S.C. 154(b) by 0 days.

(21) Appl. No.: 09/705,431

(22) Filed: Nov. 3, 2000

(51) Int. Cl.7 .............................................. B64C 33/00
(52) U.S. Cl. ............................. 244/11; 244/22; 244/28; 244/72; 244/900
(58) Field of Search ................. 244/22, 11, 28, 244/72, 900

(56) References Cited

U.S. PATENT DOCUMENTS

| | | | |
|---|---|---|---|
| 999,715 A | 8/1911 | Gundersen | 244/22 |
| 1,036,033 A | 8/1912 | Twining | 244/22 |
| 1,444,138 A | 2/1923 | Piering | 244/22 |
| 1,831,655 A * | 11/1931 | Korwin | 244/22 |
| 1,835,630 A * | 12/1931 | Bowlus | 244/22 |
| 1,845,420 A * | 2/1932 | Kingsley | 244/22 |
| 1,889,713 A | 11/1932 | Turner | 244/22 |
| 1,907,887 A | 5/1933 | Spencer | 244/22 |
| 1,938,156 A * | 12/1933 | Soehrman | 244/22 |
| 2,156,898 A * | 5/1939 | Giudice | 244/22 |
| 2,985,407 A | 5/1961 | Foster | 244/22 |
| 3,161,376 A | 12/1964 | Lyle | 244/20 |
| 3,162,400 A * | 12/1964 | Wood | 244/22 |
| 4,007,893 A | 2/1977 | Knachikian | 244/64 |
| 4,053,122 A | 10/1977 | Gar | 244/11 |
| 4,081,155 A | 3/1978 | Kuan | 244/72 |
| 4,139,171 A | 2/1979 | Harris | 244/22 |
| 4,195,438 A | 4/1980 | Dale | 244/22 |
| 4,417,707 A | 11/1983 | Leong | 244/11 |
| 4,712,749 A | 12/1987 | Fox | 244/22 |
| 4,749,149 A * | 6/1988 | Gruich | 244/22 |
| 5,170,965 A | 12/1992 | Yasuda | 244/64 |
| 5,899,408 A | 5/1999 | Bowers | 244/11 |

* cited by examiner

Primary Examiner—J. Woodrow Eldred
(74) Attorney, Agent, or Firm—Ingrid McTaggart

(57) ABSTRACT

A flapping wing flying device comprises wings that pivot about a pivot axis extending generally perpendicularly to an elongate body of the flying device, and wings that move relative to said elongate body of the flying device, so that the entire leading edge of each of the wings is moved away from and toward to the body of the flying device during flight.

21 Claims, 8 Drawing Sheets

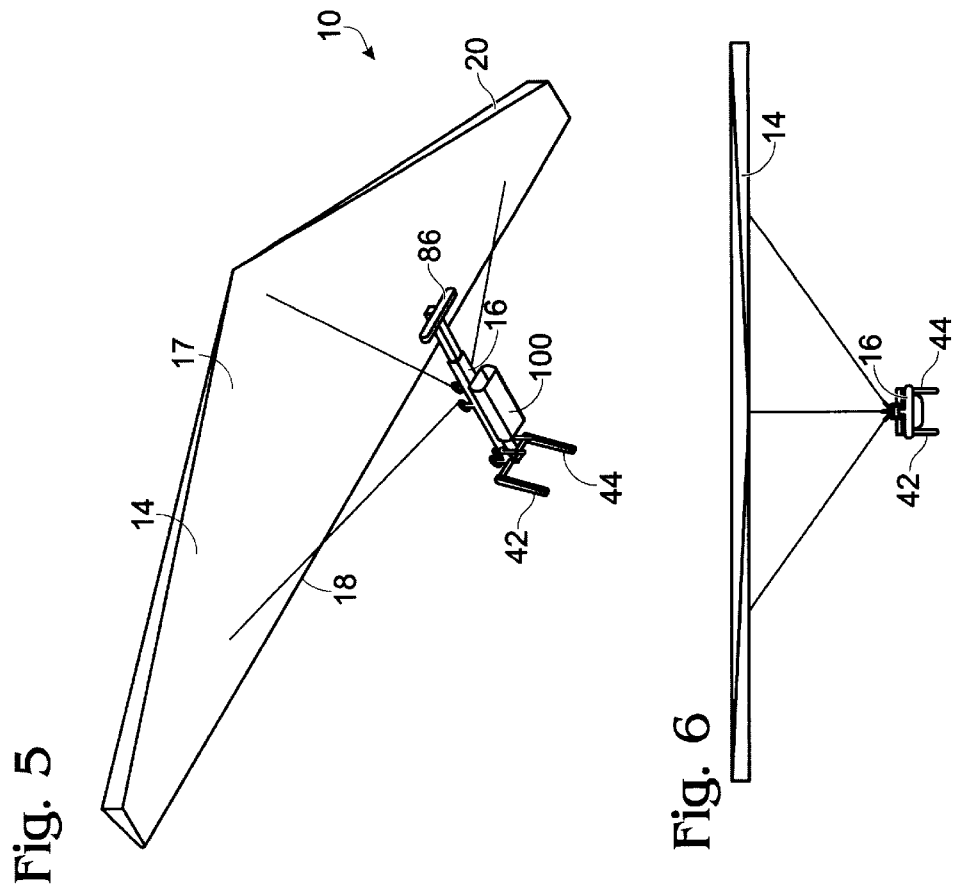
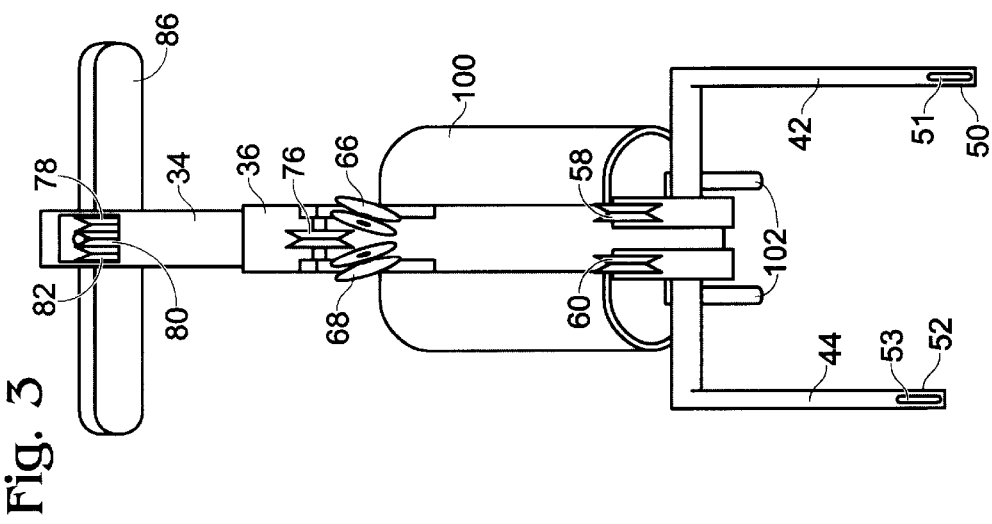

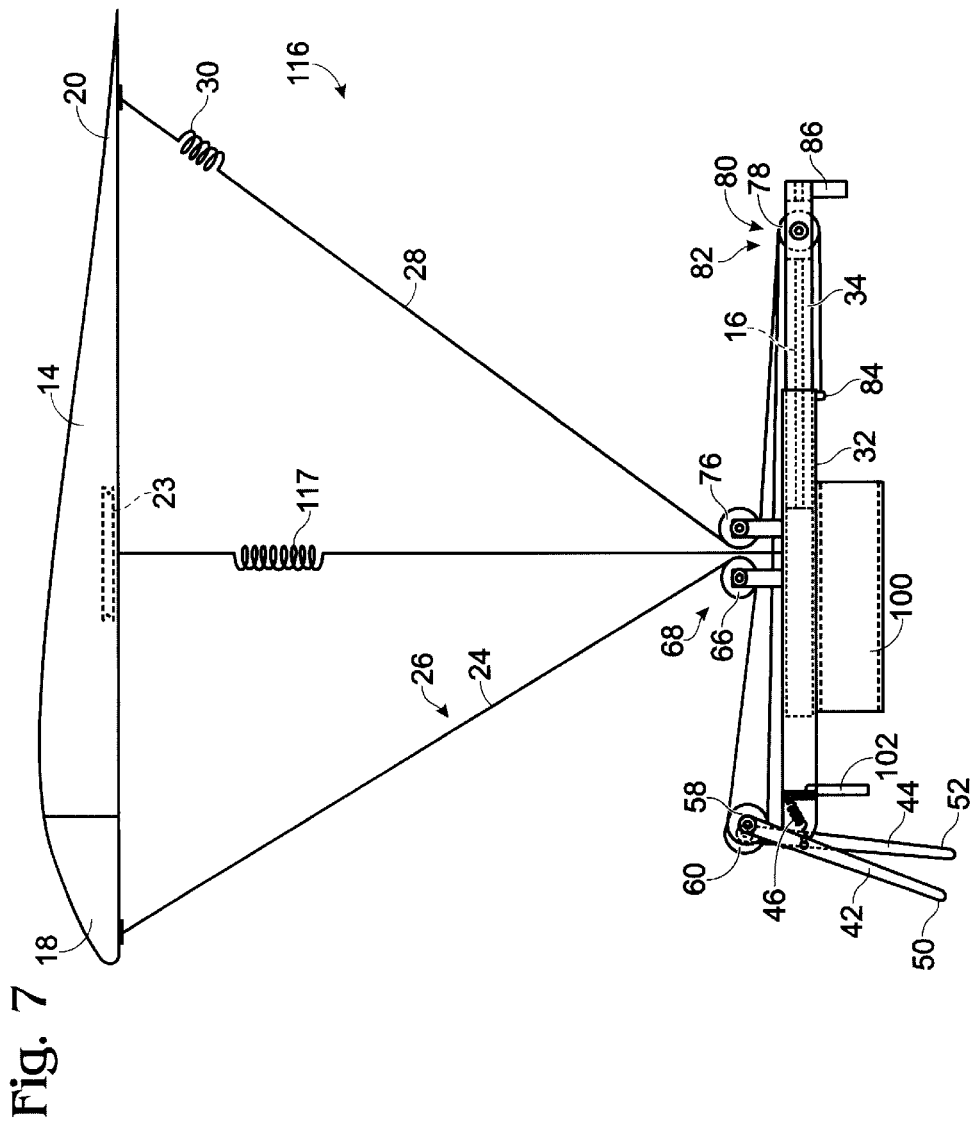

Fig. 11
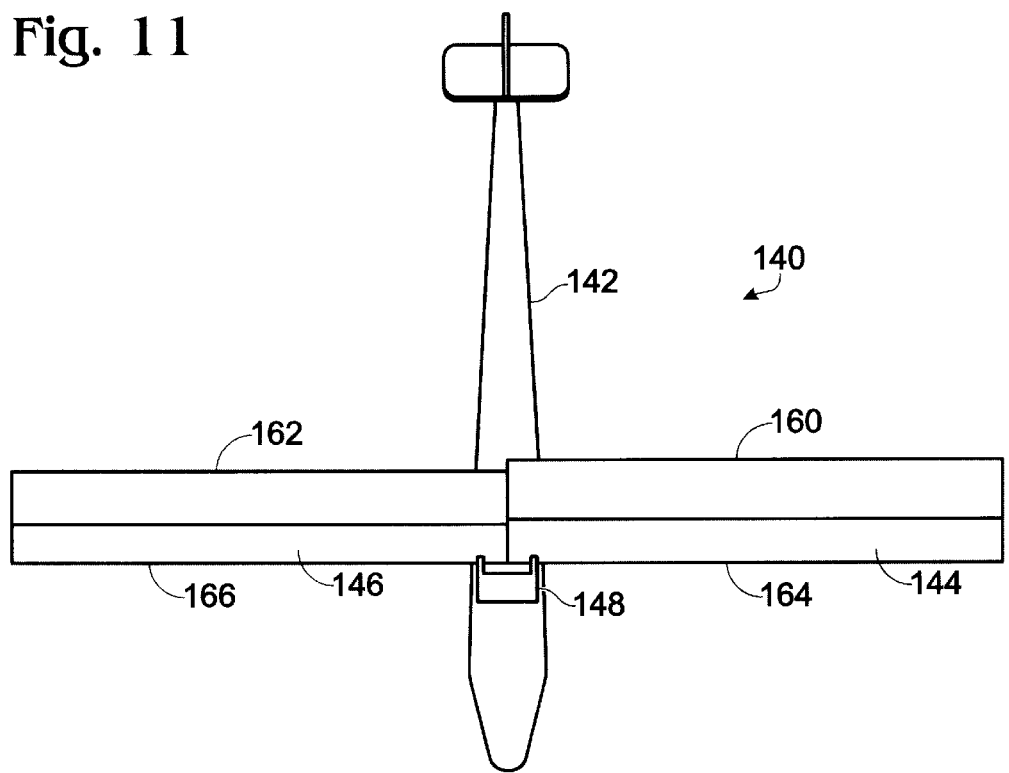
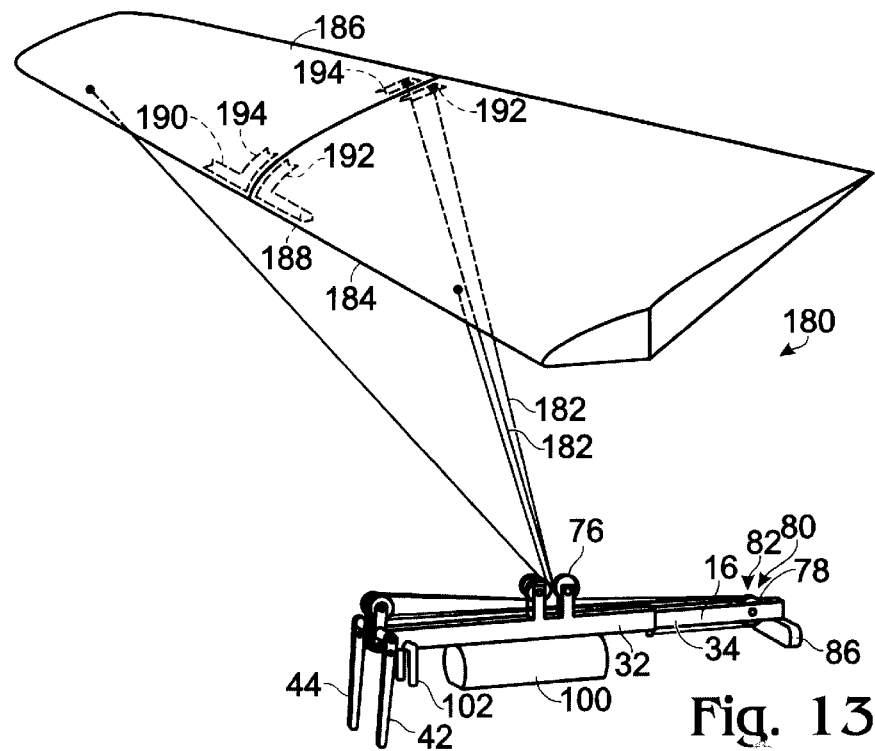
Fig. 13

FLAPPING-WING FLYING DEVICE

TECHNICAL FIELD

The present invention relates to a flapping wing flying device and, more particularly, to a flapping wing flying device having wings that pivot about a pivot axis extending perpendicularly to an elongate body of the flying device wherein the entire leading edge of each of the wings is moved vertically relative to the body of the flying device during flight.

BACKGROUND OF THE INVENTION

For centuries man has attempted to fly. This desire to fly has resulted in numerous winged inventions such as fixed-wing conventional airplanes and aircraft that simulate the flight of birds. In most conventional aircraft, the functions of power and lift are separated. Lift is provided by the rigidly outstretched wings. Changes in the geometry of the wings are limited to the movement of surfaces such as ailerons and flaps. Propellers or jet engines provide the power to move the aircraft forward through the air such that the wings can generate lift. In flapping wing flight similar to the flight of birds, however, the wings must provide both lift and propulsion. Such flapping wing devices are popular because they typically are manually powered and because they may be easily disassembled and transported.

Numerous flapping wing flying devices have been developed. In these flying devices the wings pivot upwardly and downwardly about a pivot point positioned, typically, on the main body of the aircraft. Accordingly, the tips of the wings move relative to the aircraft body through a large arc but the base of the wings remain attached to the main body of the aircraft. This pivot point arrangement may be structurally weak and typically requires complicated controls to ensure correct motion of the wings during flight. Moreover, because the wings pivot at a point where the wings are connected to the main body of the aircraft, the inner part of the wings move through a relatively small arc and therefore undergo relatively little upward and downward motion. The inner part of these flapping wings, therefore, generate a relatively small amount of lift or propulsion.

Accordingly, there is a need for a flapping wing device that may be manually operated. There is also a need for a flying device that is structurally sound and that requires relatively simple controls to ensure correct motion of the wings during flight. Moreover, there is a need for a flying device that utilizes the entire airfoil surface during the upward and downward strokes of flapping wing flight.

SUMMARY OF THE INVENTION

An object of the present invention, therefore, is to provide a flying device that may be manually operated.

A further object of the present invention is to provide a flying device that is structurally sound.

Another object of the present invention is to provide a flying device that requires relatively simple controls to ensure correct motion of the wings during flight.

Yet another object of the present invention is to provide a flying device that utilizes the entire airfoil surface during the upward and downward stokes of flapping wing flight.

The present invention provides a flapping wing flying device including wings that pivot about a pivot axis, as opposed to a pivot point, extending perpendicularly to an elongate body of the aircraft, and wherein the entire leading edge of each of the wings is moved vertically relative to the aircraft frame during flight. In particular, in one embodiment, the flying device comprises an aircraft body for supporting a person and an airfoil including a rigid front crossbar. The remainder of the airfoil comprises a flexible hang glider type airfoil. The aircraft body includes hand and foot controls connected to a pulley system, wherein the pulleys are each connected to portions of the airfoil. The foot controls allow the pilot to control upward and downward movement of the airfoil(s) so as to provide propulsion for the aircraft, and the hand controls allow the pilot to control the angle of attach of the airfoils(s) so as to control the direction of the aircraft. An elastic member within the main body of the flying device facilitates energy storage between control and/or propulsion maneuvers executed by the pilot. A second elastic member is connected between the pulley system and the trailing edge of the airfoil and acts as a dampening mechanism so that movement of the trailing edge of the airfoil lags movement of the leading edge. In this manner the airfoil is moved in a flapping motion so as to provide lift and propulsion for the flying device, while utilizing the entire airfoil surface during flight.

In another embodiment the airfoil of the flying device comprises a paragliding canopy wherein the leading edge of the airfoil is controlled to move vertically relative to the aircraft frame by a plurality of guide ropes. In yet another embodiment the flying device is powered by an engine, or a motor, and actuating springs instead of by manual power. In yet another embodiment the airfoil comprises port and starboard wings wherein the wings are moved separately.

BRIEF DESCRIPTION OF THE DRAWINGS

FIG. 3 is a front isometric view of the flying device of FIG. 1 without the airfoil or pulley ropes secured thereto;

FIG. 5 is an underside isometric view of the flying device of FIG. 1;

FIG. 6 is a rear view of the flying device of FIG. 1;

FIG. 7 is a side view of another embodiment of the flying device;

FIG. 11 is a top view of the flying device of FIG. 10;

FIG. 13 is an isometric view of another embodiment of the flying device wherein the airfoil comprises two separate wings of a hang gliding design.

DETAILED DESCRIPTION OF THE PREFERRED EMBODIMENTS

Figure 1:
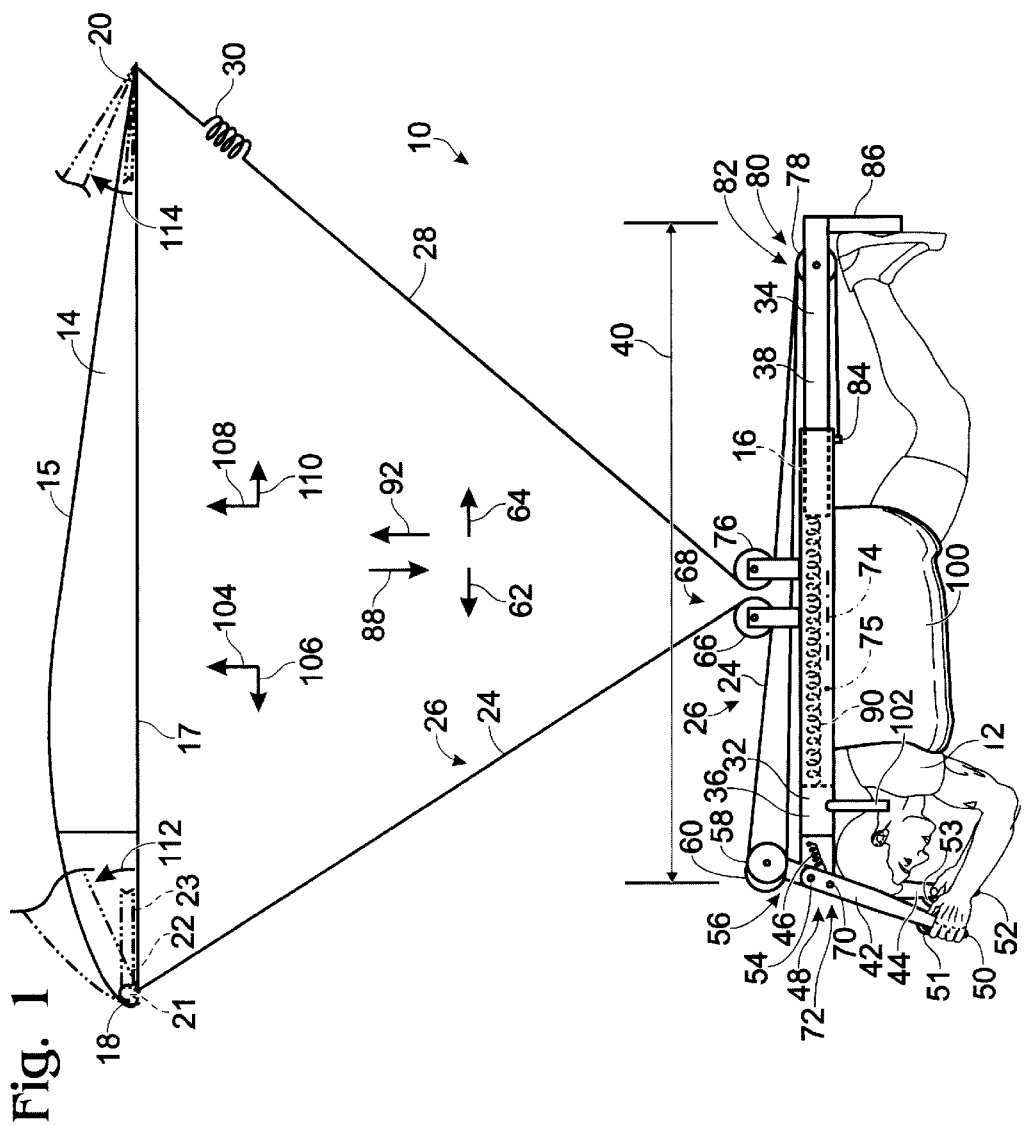
FIG. 1 is a side view of the flying device of the present invention with a pilot secured therein.

FIG. 1 is a side view of the flying device 10 of the present invention with a pilot 12 secured therein. Flying device 10 includes an airfoil 14 and a frame body 16. Airfoil 14 is made of a flexible material similar to that of a hang gliding airfoil, such as nylon or silk. Airfoil 14 includes a leading edge 18 and a trailing, or rear, edge 20. Airfoil 14 includes a curved upper surface 15 and a relatively flat lower surface 17, for purposes of lift, as will be understood by those skilled in the art. In the preferred embodiment, airfoil 14 includes a "T" shaped airfoil frame 22 wherein a crossbar 21 (shown in end view in this figure) of the "T" frame extends along the leading edge of the airfoil and a second bar 23 of the "T" frame extends from the front crossbar centrally and rearwardly to the trailing edge 20 of the airfoil. In the embodiment shown, leading edge 18 of the airfoil is secured to frame body 16 by two pulley ropes 24 and 26 (only rope 24 can be seen in this view). "Leading edge 18 may also be referred to as a leading edge region extending along approximately the forward most ten percent of airfoil 14. Crossbar 21 typically is positioned within the leading edge region and defines the leading edge of the airfoil." Ropes 24 and 26 typically are manufactured of a non-elastic material such as nylon. Trailing edge 20 of the airfoil is secured to frame body 16 by a single pulley rope 28. A portion of rope 28 may be manufactured of an elastic material, or the entire rope may be manufactured of a non-elastic material but including a biasing means 30 mounted therein (as shown), such that the rope has elastic properties, as will be described in more detail below.

Frame body 16 includes a forward region 32 and a rearward region 34. In the embodiment shown, the forward region comprises a square tubular member 36 and rearward region 34 comprises a square tubular member 38 slidably received within tubular member 36. In other words, rearward region 34 is telescopingly received within forward region 32 so that a length 40 of the frame body is adjustable during flight. Frame body 16 further comprises a port, or left, handle control 42 and a starboard, or right, handle control 44. Handles 42 and 44 are biased into a nominal position (starboard handle 44 is shown in the nominal position) by biasing means, such as springs, 46 and 48, respectively (only spring 46 can be seen in this view). Each of handles 42 and 44 comprise a lower grip portion 50 and 52, respectively, a pivot point, 54 and 56, and pulleys 58 and 60 secured opposite lower grip portions 50 and 52, respectively. Pivot points 54 and 56 are positioned between lower grip portions 50 and 52 and pulleys 58 and 60, respectively, so that forward movement of a grip in a forward direction 62 will result in rearward movement of the corresponding pulley in a rearward direction 64.

Still referring to FIG. 1, frame body 16 includes a central port pulley 66 and a central starboard pulley 68. Each of the pulleys discussed herein typically comprises a wheel mounted on friction reducing ball bearings but any type of pulley or other friction reducing device may be utilized. Rope 24 extends around pulley 66, around pulley 58 on handle 42, and is secured to the frame as will be discussed in more detail below. Rope 26 extends around pulley 68, around pulley 60 on handle 44, and is secured to the frame as will be discussed in more detail below. Springs 46 and 48 are secured to the handles by fasteners 70 and 72, respectively. Accordingly, forward movement of port grip 50 in direction 62 will lengthen the length of rope 24 extending between airfoil 14 and frame 16, and rearward movement of grip portion 50 in direction 64 will shorten the length of rope 24 extending between airfoil 14 and frame 16, i.e., the vertical distance between the airfoil and the frame. Of course, the overall length of non-elastic ropes 24 and 26 themselves is not changed during this process. Similarly, forward movement of starboard grip 52 in direction 62 will lengthen the length of rope 26 extending between airfoil 14 and frame 16, and rearward movement of starboard grip 52 in direction 64 will shorten the length of rope 26 extending between airfoil 14 and frame 16. In this manner, either the port or the starboard portions of airfoil 14 may be tilted downwardly or upwardly with respect to frame 16 of the flying device. When the grips are moved in unison, the entire forward edge of the airfoil will be moved downwardly or upwardly, as is desired. Accordingly, handle controls 42 and 44 control the aircraft by allowing turning of the flying device and maneuvering of the device into ascents, descents and stalls. During operation of the handle controls, the length of rope 28 extending between the trailing edge of the airfoil and the frame is not changed. Accordingly, the handle controls allow the pilot to move the airfoil into an upward or a downward inclined position with respect to the frame. However, the timing of movement of trailing edge 20 is affected by biasing means 30 as will be discussed below.

As stated earlier, handles 42 and 44 are biased by springs 46 and 48 so that when the handles are not forced rearwardly or forwardly by the pilot of the aircraft, the handles will be restrained by the springs into a nominal position. In particular, the springs bias the handles rearwardly in direction 64 wherein the weight of the pilot and the frame on the airfoil causes ropes 24 and 26 to bias the handle forwardly in direction 62. The nominal position, as shown in this figure by handle 44, is when both the handles extend perpendicularly downwardly from an elongate axis 74 of frame body 16. Accordingly, the strength of springs 46 and 48 should be chosen based on the combined weight of the frame and the pilot. Grip portions 50 and 52 may further comprise locking levers 51 and 53, respectively, such that the pilot must depress the locking levers in order the move the handles forwardly or rearwardly. In such an embodiment, when the locking levers are not depressed, the levers will retain the handle in the same position as when the levers were released. Accordingly, the levers act as a "cruise control" to allow the pilot to exert control over the flying device, and then leave the controls in that position, while releasing his or her hands for periods of time. Accordingly, springs 46 and 48, and locking levers 51 and 53, provide a respite for the pilot during flight so that the pilot need not continually exert pressure on handles 42 and 44 to control the pitch, yaw and roll of the flying device.

Still referring to FIG. 1, forward region 32 of frame 16 further comprises a rear rope pulley 76, typically positioned just behind pulleys 66 and 68. Rearward region 34 of frame 16 includes three pulleys 78, 80 and 82, typically aligned in a row, wherein only the port-most pulley 78 can be seen in this view. Front pulley rope 24 extends over pulley 78 and is secured by a fastener 84 at a rearward most portion of forward region 32 of frame 16. Front pulley rope 26 extends over pulley 82 and is also secured by fastener 84 on frame 16. Rear pulley rope 28 extends over pulley 76 and over pulley 80 and is secured by fastener 84 on frame 16.

Rear region 34 of frame 16 includes a foot pedal 86 that when pushed by the legs of the pilot will extend rear portion 34 of frame 16 in rearward direction 64 away from forward portion 32. This will lengthen the length of the three pulley ropes 24, 26 and 28 that extends from pulleys 66, 68 and 76, respectively, over pulleys 78, 82, and 80, respectively, to fastener 84. In other words, the airfoil is pulled downwardly in a direction 88 toward frame 16. A biasing means 90 positioned within forward region 32 of the frame is nominally compressed by the weight of the pilot and the frame which are suspended from the airfoil, i.e., the lift on the airfoil tends to pull the airfoil upwardly and away from the frame such that the pulley ropes bias region 34 toward region 32 of the frame. Accordingly, biasing means 90 is decompressed and thereby assists rearward motion of region 34 of the frame when the pilot pushes rearwardly on pedal 86. When the pilot releases pressure on foot pedal 86, the lift on the airfoil and the competing force of gravity on the frame and the pilot, will force rearward region 34 toward forward region 32 of the frame and will once again compress spring 90. This shortening of the frame will lengthen the amount of pulley ropes extending between the frame and the airfoil and will allow the airfoil to move upwardly in a direction 92. Accordingly, biasing means 90 acts as an energy storage device to help the pilot move foot pedal 86 rearwardly.

As stated earlier, biasing means 30 positioned within rear pulley rope 28 creates a lag reaction time of the trailing edge 20 of airfoil 14 with respect to the leading edge 18. Accordingly, the pilot controls the initial angle of inclination of the airfoil, and eventually, movement of the entire airfoil by movement of pedal 86. For example, when pedal 86 is moved rearwardly, leading edge 18 of the airfoil is pulled toward frame 16. After a short time interval, biasing means 30 allows the trailing edge of the airfoil to move in a manner similar to the previous movement of the leading edge of the airfoil so as to position the airfoil in a generally horizontal position, i.e., parallel to elongate axis 74 of frame 16 during typical horizontal flight. In other words, the leading edge will be moved down first, or moved up first, as the case may be, before corresponding downward or upward movement of the trailing edge of the airfoil, when foot pedal 86 is actuated. To facilitate movement of the foot pedal, or pedals as the case may be in a dual wing embodiment, forward region 32 of the frame includes a pilot harness 100 and shoulder braces 102 which allow the pilot to exert a rearward force on foot pedal(s) 86.

Operation of the flying device will now be described. Pilot 12 may move both handles 42 and 44 rearwardly in direction 64 which will pull leading edge 18 downwardly in direction 88. This will allow the pilot to guide the flying device into a descent. Pilot 12 may then move both handles 42 and 44 forwardly in a direction 62 which will allow leading edge 18 to be pulled upwardly by the lift on the airfoil in direction 92. This will allow the pilot to guide the flying device into an ascent or to stall the flying device. Accordingly, the pilot uses the handle controls to change the angle of attach of the wings so as to control the flying device.

The pilot may also force foot pedal 86 rearwardly which will force the entire airfoil downwardly toward frame 16. Due to biasing means 30, leading edge 18 will first move downwardly, and movement of trailing edge 20 downwardly with respect to the frame will follow the movement of leading edge 18 by a short time period, typically on the order of a fraction of a second to several seconds. (Those skilled in the art will understand that the length of the time lag will vary based on the weight and design of the aircraft, flying conditions, and numerous other factors.) This will cause a lift 104 in upward direction 92 and a thrust 106 in forward direction 62. The pilot may then allow foot pedal 86 to be pulled by the lift on the airfoil toward front portion 32 of the frame, which will allow the entire airfoil to move away, i.e., upwardly from frame 16. Due to biasing means 30, leading edge 18 will first move upwardly, and upward movement of trailing edge 20 with respect to the frame will follow the movement of leading edge 18 by a short time period. This will cause a lift 108 in upward direction 92 and a drag 110 in rearward direction 64. The angle 112 of the airfoil with respect to the horizon during the downward inclined position of the airfoil, and the angle 114 of the airfoil with respect to the horizon during the upward inclined position of the airfoil, will typically be different from one another, and may be chosen by the pilot (typically by use of the hand controls) so as to maximize lift and thrust during the first movement, and to maximize lift and to minimize drag, during the second movement of the flapping motion. These angles will be adjusted by the pilot during flight and during each flapping stoke so as to take into account the weight of the frame and the pilot, the size of the airfoil, wind conditions, and other such conditions that may affect flight of the device. Moreover, the angle of incline (either inclined upwardly or downwardly) of the airfoil typically will be constantly changing during the flapping motion so that the airfoil moves through a cyclical path of changing angles during each flapping motion. By cyclically moving foot pedal 86 rearwardly and then allowing the pedal to be pulled forwardly by the lift on the wings, the flying device will undergo flapping wing lift and propulsion which is controlled by the pilot. If the pilot is able to move biasing means 90 in a rhythmic oscillation motion, the pilot can cause spring 90 and the lift on the airfoil to make the pilot's manual movement more efficient.

The pilot 12 may decide to move only handle 42 rearwardly in direction 64 which will pull leading edge 18 downwardly in direction 88 on the port side of the flying device. Accordingly, leading edge 18 of the airfoil will not be positioned parallel to an axis 75 which extends horizontally perpendicular to elongate axis 74 of the flying device during horizontal flight. This will cause the flying aircraft to turn or bank toward the port side of the aircraft. Similarly, moving handle 44 forwardly will create the same effect. In contrast, moving handle 42 forwardly, or moving handle 44 rearwardly, will cause a starboard turn or bank of the aircraft. Moving of the handles simultaneously in opposite directions will sharpen the turn, i.e., decrease the radius of the turn, as will be understood by those skilled in the art. Accordingly, the handles allow the pilot to guide the flying device during flight.

In summary, the pilot operates foot pedal 86 to initiate propulsion maneuvers, i.e., moving the entire wing upwardly and downwardly with respect to the frame, to achieve flapping flight. The momentary initial inclination, i.e., the angle of attack, of the wing or wings during this flapping motion is achieved by biasing means 30, also called dampening means, which slows movement of the trailing edge of the airfoil so that movement of the trailing edge follows in time the movement of the forward edge of the airfoil. Control maneuvers, such as ascents and descents, are achieved by moving the handle grips which move the leading edge of the airfoil. Turns or banks are accomplished by operating one of the handles or both of the handles simultaneously in differing directions. During each of the in-flight maneuvers, the entire wing is moved about a pivot axis, not merely a pivot point, so that the entire surface of the airfoil is utilized during each such maneuver. Moreover, during propulsion, the entire airfoil is moved upwardly or downwardly with respect to the frame, in contrast to the prior art wings wherein the outer edges of the wings are rotated about a single pivot point.

Figure 2:
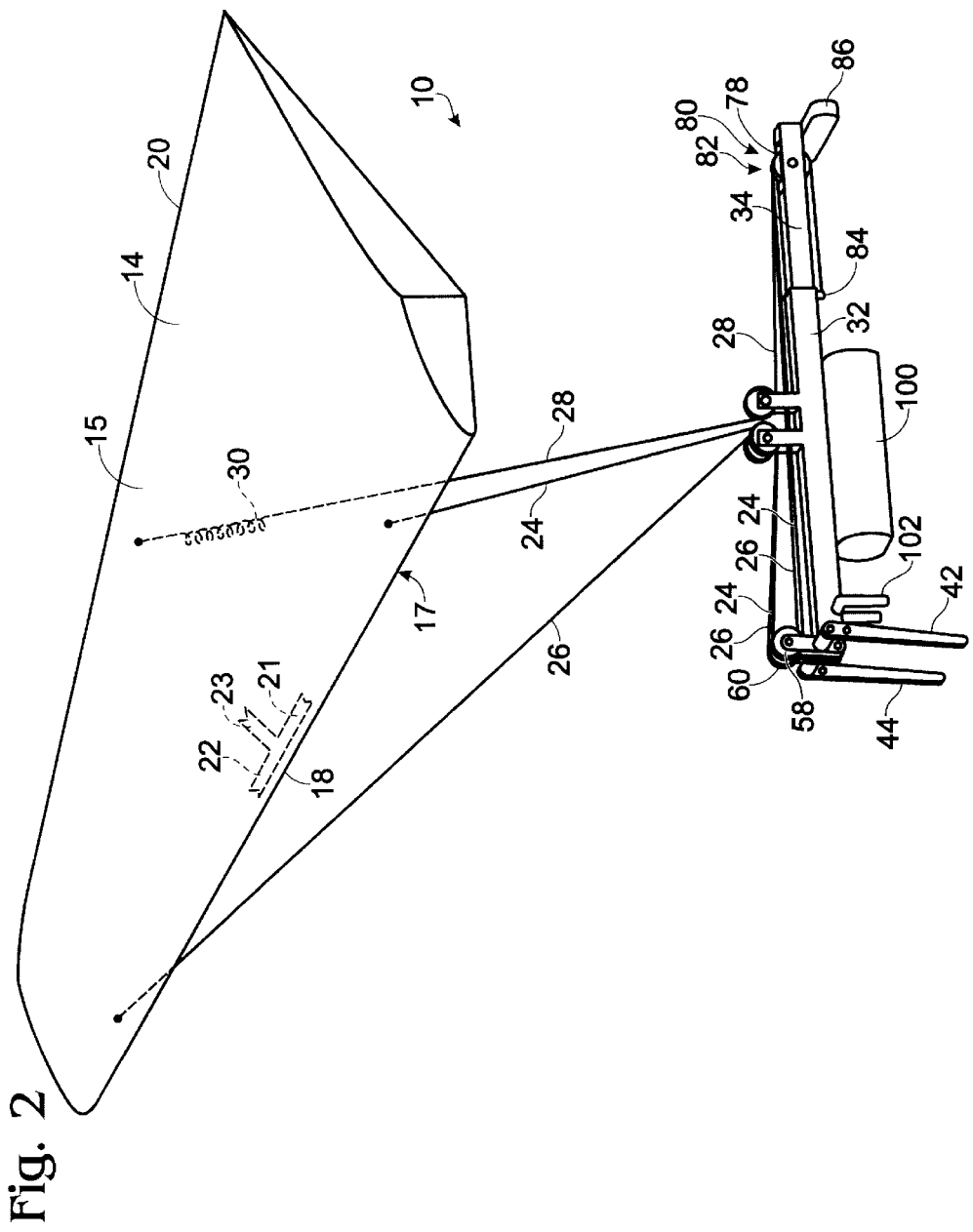
FIG. 2 is an isometric view of the flying device of FIG. 1.

FIG. 2 is an isometric view of flying device 10 wherein a pilot is not positioned within the device.

FIG. 3 is a front isometric view of the flying device without the airfoil or pulley ropes secured thereto. Pulleys 66 and 68 are positioned at an inclined angle so as to allow pulley ropes 24 and 26 (not shown in this figure) to extend downwardly and around the pulleys from the outer edges of the airfoil.

Figure 4A:
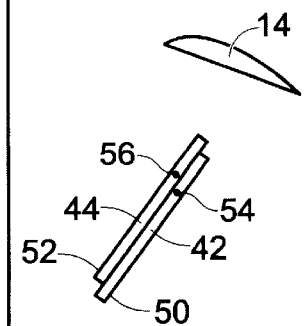
FIGS. 4A–F are schematic side views of the flying device showing control of the airfoils by use of the hand and foot controls.
Figure 4B:
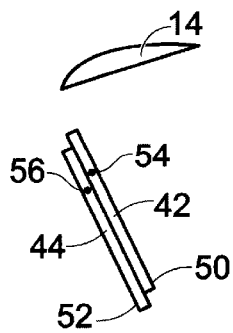
Figure 4C:
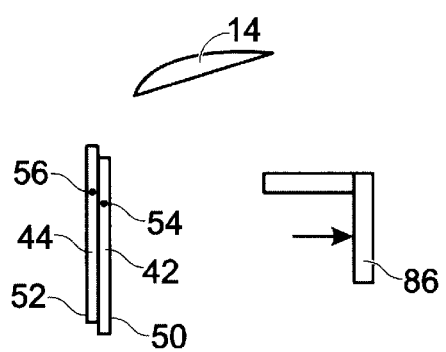
Figure 4D:
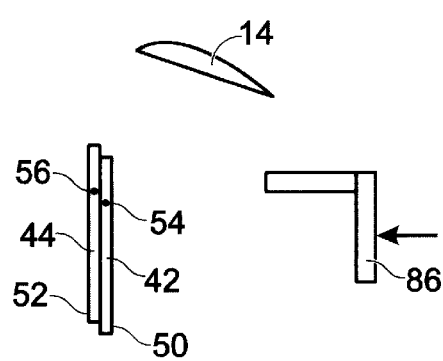
Figure 4E:
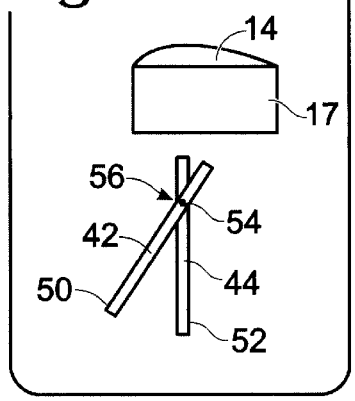
Figure 4F:
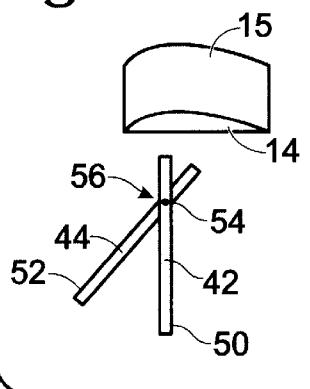

FIGS. 4A–F are schematic side views of the flying device showing control of the airfoil, or multiple airfoils, by use of the hand and foot controls. FIG. 4A shows an ascent wherein leading edge 18 of the airfoil is allowed to move upwardly by forward operation of hand controls 50 and 52. FIG. 4B shows a descent wherein leading edge 18 of the airfoil is pulled downwardly by rearward operation of hand controls 50 and 52. FIG. 4C shows a downward portion of a flapping, i.e., propulsion, stroke wherein foot pedal 86 is moved rearwardly. FIG. 4D shows an upward portion of a flapping propulsion stoke wherein foot pedal 86 has been pulled forwardly by the lift on the airfoil. FIG. 4E shows a starboard turn wherein hand control 50 has been moved forwardly and the lower surface 17 of the airfoil is visible. FIG. 4F shows a port turn wherein hand control 52 has been moved forwardly and the upper surface 15 of the airfoil is visible.

FIG. 5 is an underside isometric view of the flying device showing the rear of the flying device and excluding the pulley ropes. In this embodiment, the airfoil is shown as having a depth, also called its length, extending from front edge 18 to the trailing edge 20, which is greatest at a central portion of the airfoil.

FIG. 6 is a rear view of the flying device excluding the pulley ropes.

FIG. 7 is a side view of another embodiment of the flying device. Flying device 116 is similar to device 10 except that biasing means 90 within forward region 32 of frame 16 has been replaced with a biasing means 117 extending between frame 16 and bar 23 of the airfoil frame. The opposing forces of lift on the airfoil and gravity on the frame tends to stretch spring 117. Accordingly, spring 117 acts to bias the airfoil toward the frame so that the pilot may utilize the strength of spring 117 to help facilitate rearward movement of foot pedal 86. Accordingly, biasing means 117 can be thought of as an energy storing device which is activated by the pilot during flapping motion of the airfoil.

Figure 8:
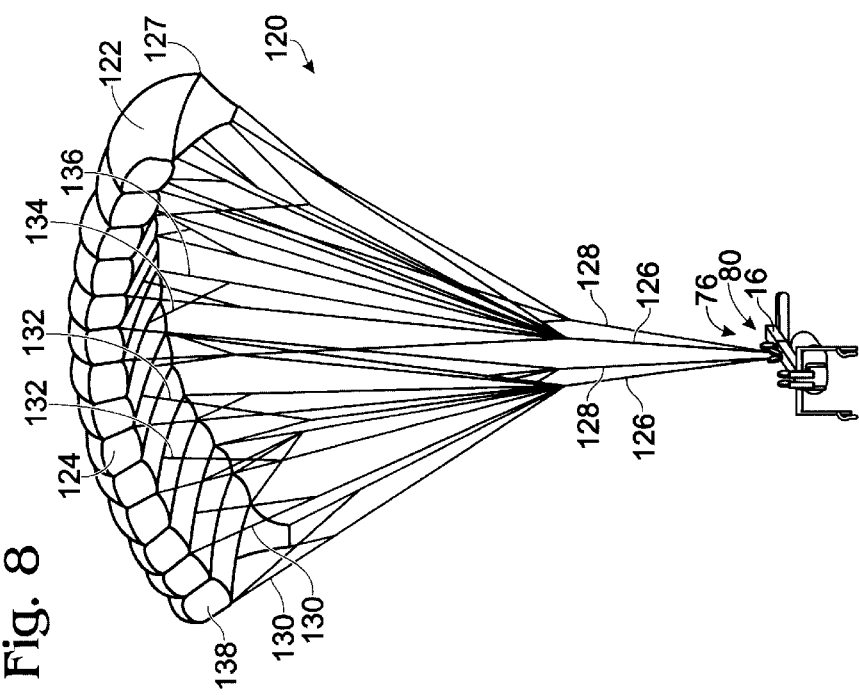
FIG. 8 is an isometric view of another embodiment of the flying device wherein the airfoil comprises a paragliding canopy.

FIG. 8 is an isometric view of another embodiment of the flying device wherein the airfoil comprises a paragliding canopy. In this embodiment, the flying device 120 includes a paragliding canopy 122 manufactured of a soft flexible material. The canopy does not include a rigid frame. Instead, a forward edge 124 of canopy 122, similar to the rigid front crossbar of the embodiment of FIG. 1, is controlled by the pilot as a single element by a large number of ropes 126. "Accordingly, forward edge 124 defines the pivot axis of the airfoil in this embodiment." A rear edge 127 of the canopy is also controlled by a large number of ropes 128. Each of ropes 126 has two branches in the preferred embodiment wherein a first set of branches 130 are secured to forward edge 124. A second set of branches 132 are secured slightly rearwardly of forward edge 124. Ropes 128 also include two sets of branches. A first set of branches 134 are secured rearwardly of set 130 (more clearly shown in FIG. 9), and a second set of branches 136 of ropes 128 are secured to trailing edge 127 of canopy 122. Leading edge 124 of the canopy includes pockets 138 for receiving air therein so that the canopy is "inflated" and has a balloon-like appearance during flight. This pocket structure creates an airfoil shape so as to provide lift to the flying device.

Ropes 126 and 128 are connected to frame 16 which is similar in design to that shown in FIG. 1. One slight modification is that in the embodiment shown in FIG. 8, there are two rear ropes 128, instead of a single rear pulley rope 28 of the embodiment shown in FIG. 1. Accordingly, pulley system 76 comprises two pulleys instead of one, and pulley system 80 comprises two pulleys instead of one. This dual rear pulley rope system facilitates control of the airfoil in this embodiment due to the flexible shape of the paragliding canopy airfoil.

Figure 9:
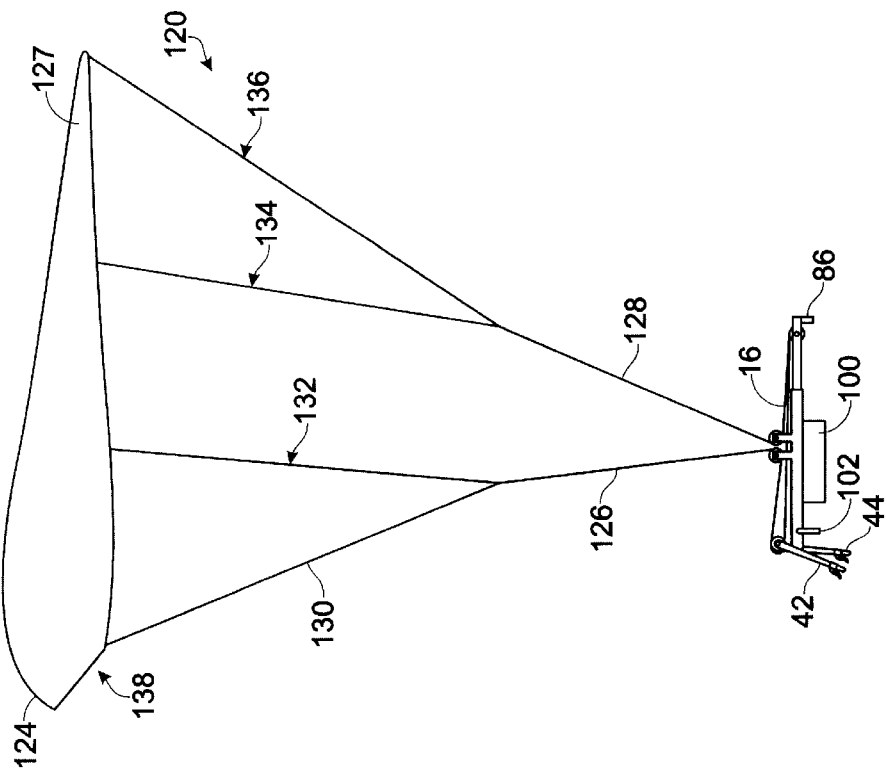
FIG. 9 is a side view of the flying device of FIG. 8.

FIG. 9 is a side view of flying device 120 of FIG. 8. In this view, for ease of illustration, rope sets 126 and 128 are shown wherein only the closest rope sets to the viewer can be seen. First branch 130 of rope 126, and the lower portion of rope 126 that extends through the pulley system, typically is manufactured of a non-elastic rope such as nylon or other strong, durable and lightweight rope. Second branch 132 of rope 126, i.e., the upper portion between rope 126 and the airfoil, typically is manufactured of an elastic material. Similarly, first and second branches 134 and 136 of ropes 128 are manufactured of an elastic material. However, the lower portion of ropes 128 that extend through the pulley system, are manufactured of non-elastic material. Accordingly, branches 132, 134 and 136 are all elastic and function cooperatively in a manner similar to that of biasing means 30 of FIG. 1. These elastic rope portions serve to dampen the timed response of rear edge 127 of the canopy so as to allow flapping motion of canopy 122 by the upward or downward movement of leading edge 124 of the canopy.

Figure 10:
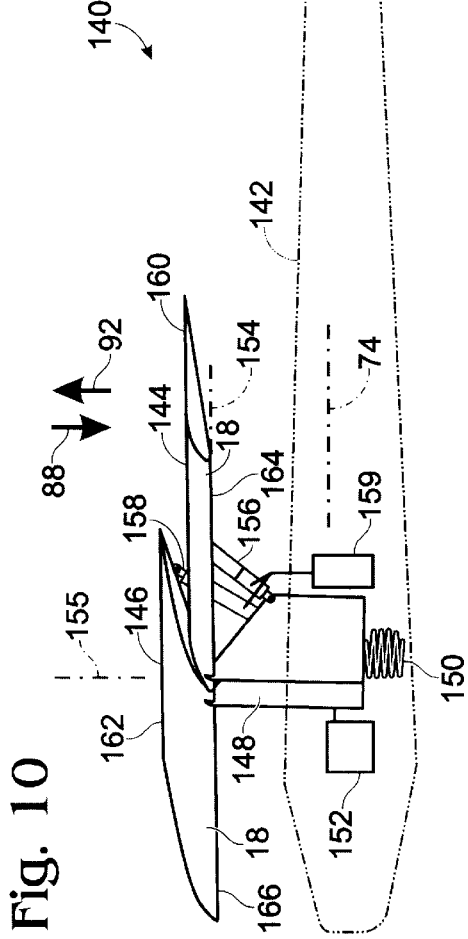
FIG. 10 is a side view of another embodiment of the flying device wherein the device includes an engine.

FIG. 10 is a side view of another embodiment of the flying device wherein the device includes an engine. Flying device 140 comprises a rigid body 142 suitable for receiving a pilot therein (not shown). Two separate rigid wings 144 and 146 are each connected to a base 148 which is connected to a biasing means 150 and an engine 152 positioned adjacent the base. Wings 144 and 146 are secured to base 148 along a pivot axis 154 extending through a leading edge 18 of the wings such that the wings each pivot about axis 154. Motor or engine 152 actuates base 148 to move upwardly and downwardly, so as to move the attached wings upwardly and downwardly, i.e., away from and toward the aircraft frame, along a path 155 perpendicular to elongate axis 74 of body 142. In contrast, prior art pivot point connected flapping wings do not move "away from" an aircraft frame but merely pivot or rotate about the aircraft frame. In other words, applicant's entire wing assembly moves away from and toward the aircraft frame, and does not solely pivot or rotate about the aircraft frame. Biasing means 150 may be used to store energy within the system, similar to spring 117 of FIG. 7, so as to ease the burden on actuator 152. In other words, the lift on the airfoils will tend to stretch spring 150. Thereafter, when actuator 152 moves base 148 downwardly, the spring will bias the base downwardly thereby decreasing the work required by actuating means 152.

Additional biasing members 156 and 158 are connected to wings 144 and 146, respectively. The biasing members comprise a lower hydraulic cylinder portion and an upper spring-containing portion. The hydraulic cylinders are actuated by a second engine 159 to move a rear edge 160 and 162, respectively, of wings 144 and 146 upwardly in direction 92 or downwardly in direction 88. Engine 159 may be operated independently of the movement of base 148 by engine 152 such that biasing means 156 and 158 mimic the functionality of hand controls 42 and 44 of FIG. 1 to control the aircraft. The spring portions of biasing means 156 and 158 are operated independently of engine 159 and the corresponding hydraulic functionality so that biasing means 156 and 158 function as dampening means during propulsion, similar to biasing means 30 of FIG. 1.

During use as a dampening means, the springs of biasing means 156 and 158 are self actuated by the lift on the airfoil, i.e., movement of the trailing edges 160 and 162, respectively, of the wings is dampened with resect to movement of leading edges 164 and 166, respectively, of each of the wings. In particular, base 148 moves the leading edges of the airfoils away from the frame. The springs of members 156 and 158 initially dampen subsequent movement of the trailing edges of the airfoil. After a short lag time the trailing edges move through the same movement that the leading edge experienced. Accordingly, biasing means 156 and 158 accomplish the same function as the dampening biasing means 30 of FIG. 1 during flapping propulsion movement of the wings. By actuating base 148, and biasing members 156 and 158, flapping motion of wings 144 and 146 is achieved without manual exertion by the pilot. The pilot actuates the hydraulic cylinders of members 156 and 158 by engine 159 so as to control the aircraft. Accordingly, biasing means 156 and 158 accomplish the same function as the hand controls of FIG. 1 during control maneuvers of the aircraft. Similar to the other embodiments shown, each of wings 144 and 146 pivot about a leading edge 164 and 166, respectively, rather than pivoting about a pivot point. This allows the entire breadth of the wings to be fully utilized in providing lift and propulsion to the flying device. Moreover, the entire wing is moved away from and toward the aircraft body, and does not merely pivot about a pivot point on the body.

FIG. 11 is a top view of the flying device of FIG. 10 wherein wing 146 is shown inclined downwardly and wing 144 is shown in a relatively flat orientation. In this embodiment, the wings are of a rigid design similar to the rigid wings found on fixed wing aircraft. However, the wings of the present invention are moved by base 148 such that the entire wing system is moved relative to the aircraft frame.

Figure 12:
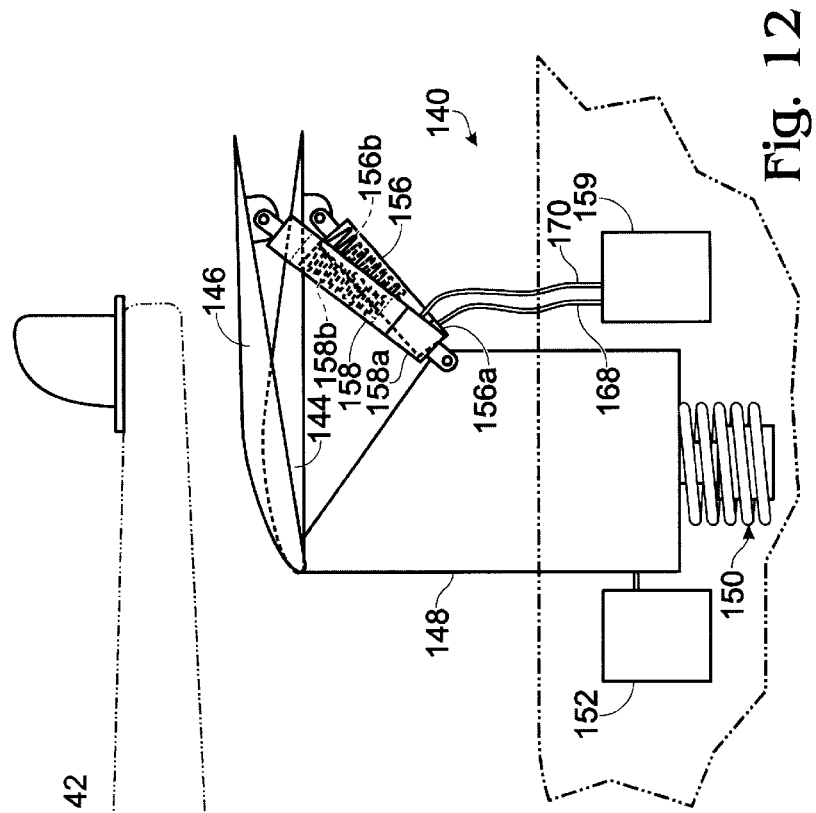
FIG. 12 is a detailed side view of the engine and base of the flying device of FIG. 10.

FIG. 12 is a side view of the base area of the flying device of FIG. 10 wherein biasing members 156 and 158 are shown connected to motor 159 by control cables 168 and 170. Members 156 and 158, respectively, include hydraulic cylinders 156a and 158a and springs 156b and 158b.

FIG. 13 is a isometric view of another embodiment of the flying device wherein the airfoil comprises two separate wings of a hang gliding design. Flying device 180 comprises a frame 16 similar to that shown in FIG. 8. In particular, in the embodiment shown in FIG. 13 there are two rear ropes 182, instead of a single rear pulley rope 28 as in the embodiment shown in FIG. 1. Accordingly, pulley system 76 comprises two pulleys instead of one, and pulley system 80 comprises two pulleys instead of one. This dual rear pulley rope system typically is required in this embodiment due to the presence of dual wings. Each of wings 184 and 186 comprise a frame including a leading edge cross bar 188 and 190, respectively, and a rearwardly extending bar 192 and 194. Accordingly, when the wings are both positioned at the same inclined angle, the device appears similar in appearance to that shown in FIG. 1. However, the dual wing arrangement allows the pilot to incline one or both wings upwardly or downwardly, separate from the other wing. This improves the control of the flying device as will be understood by those skilled in the art. The dampening effect of the biasing members on the airfoil may also be accomplished by utilizing a stretchable material to manufacture to airfoil. In other words, instead of a biasing means 30 positioned within ropes 182, the airfoil may be manufactured of a sheet of elastic, stretchable material, or the like.

In the above description numerous details have been set forth in order to provide a more through understanding of the present invention. It will be obvious, however, to one skilled in the art that the present invention may be practiced using other equivalent designs.

I claim:

1. A flying device comprising:
   a frame adapted for supporting a pilot thereon;
   an airfoil including a leading edge and a trailing edge, said airfoil adapted for pivotal movement about a pivot axis extending through said leading edge and said airfoil adapted for movement of the leading edge of the airfoil away from said frame;
   means for pivoting said airfoil about said pivot axis; and
   means for moving said leading edge of said airfoil away from said frame.

2. The flying device of claim 1 wherein said means for moving said leading edge of said airfoil away from said frame also moves said trailing edge of said airfoil away from said frame, said flying device further comprising dampening means for dampening movement of said trailing edge such that movement of said trailing edge away from said frame occurs after movement of said leading edge away from said frame.

3. The flying device of claim 1 wherein said means for pivoting said airfoil about said pivot axis is chosen from the group consisting of a rope and pulley apparatus, a rope system, an engine, a motor, and a hydraulic system.

4. The flying device of claim 1 wherein said means for moving said leading edge away from said frame is chosen from the group consisting of a rope and pulley apparatus, a rope system, an engine, a motor, and a hydraulic system.

5. The flying device of claim 1 wherein said airfoil is chosen from the group consisting of a paragliding airfoil, a hang gliding airfoil, a stretchable airfoil, and a rigid airfoil.

6. A flying device comprising:
   a frame adapted for supporting a pilot thereon;
   an airfoil including a leading edge and a trailing edge, said airfoil adapted for pivotal movement about a pivot axis extending through said leading edge and said airfoil adapted for movement of the leading edge of the airfoil away from said frame;
   means for pivoting said airfoil about said pivot axis; and
   means for moving said leading edge of said airfoil away from said frame;
   wherein said means for moving said leading edge of said airfoil away from said frame also moves said trailing edge of said airfoil away from said frame;
   dampening means for dampening movement of said trailing edge such that movement of said trailing edge away from said frame occurs after movement of said leading edge away from said frame; and
   wherein said dampening means is chosen from the group consisting of a spring, an elastic rope, and a stretchable airfoil.

7. The flying device of claim 1 wherein said means for moving said leading edge of said airfoil away from said frame is adapted for moving said leading edge of said airfoil toward said frame.

8. The flying device of claim 1 wherein said airfoil includes a rigid airfoil frame comprising a cross bar extending parallel to said leading edge and a second bar extending perpendicular to said leading edge.

9. A flapping wing aircraft comprising:
   a frame;
   an airfoil operatively connected to said frame; and
   means for moving said airfoil sequentially away from and toward said frame during flight;
   wherein said aircraft further comprises means for pivoting said airfoil about an airfoil axis positioned directly adjacent a leading edge of said airfoil.

10. A flapping wing aircraft comprising:
a frame;
an airfoil operatively connected to said frame; and
means for moving said airfoil sequentially away from and toward said frame during flight;
wherein said means for moving said airfoil sequentially away from and toward said frame comprises a pulley system connected to a movable foot pedal of said frame.

11. The flapping wing aircraft of claim 10 wherein said aircraft further comprises means for pivoting said airfoil about an airfoil axis; and
wherein said means for pivoting said airfoil about said airfoil axis comprises a first rope connected to a first handle on said frame via a first pulley, and a second rope connected to a second handle on said frame via a second pulley.

12. The flapping wing aircraft of claim 10 wherein said pulley system includes a biasing member that biases said foot pedal toward a nominal position.

13. A flapping wing aircraft comprising:
an aircraft frame including a base movable toward and away from a remainder of said frame;
a wing secured to said base, said wing being moved toward and away from said frame as said base is moved toward and away from said remainder of said frame, wherein movement of said wing toward and away from said remainder of said frame provides flapping wing movement of said wing so as to provide lift and propulsion for said aircraft; and
a pulley system connected to a movable foot pedal of said frame for moving said wing away from and toward said frame.

14. The aircraft of claim 13 wherein said wing includes a leading edge that defines a pivot axis and wherein said wing is adapted for pivotal movement about said pivot axis as said wing is moved toward and away from said remainder of said frame.

15. The aircraft of claim 13 further comprising a second wing, wherein said second wing is secured to said base, said second wing being moved toward and away from said remainder of said frame as said base is moved toward and away from said remainder of said frame, wherein movement of said second wing toward and away from said remainder of said frame provides flapping wing movement of said second wing so as to provide lift land propulsion for said aircraft.

16. The aircraft of claim 13 further comprising a first biasing means adapted for dampening movement of a trailing edge of said wing, and a second biasing means adapted for urging said wing into a nominal position with respect to said remainder of said frame.

17. A method of flying an aircraft comprising the steps of:
providing an aircraft frame; providing
an airfoil operatively connected to said aircraft frame;
moving said airfoil away from said aircraft frame;
providing a dampening device connected to said airfoil such that movement of said airfoil away from said aircraft frame comprises movement of a leading edge of said airfoil away from said frame and thereafter comprises movement of a trailing edge of said airfoil away from said aircraft frame, wherein said dampening device is chosen from the group consisting of a spring, an elastic rope, and a stretchable airfoil; and
moving said airfoil toward said frame, wherein said airfoil provides lift and propulsion for flying during said movement of said airfoil away from and toward said frame.

18. The method of claim 17 further comprising tilting said airfoil with respect to said frame so as to control a direction of said aircraft during flying.

19. The method of claim 17 wherein said step of moving said airfoil away from said frame and said step of moving said airfoil toward said frame are accomplished manually.

20. A flying device comprising:
a frame adapted for supporting a pilot thereon;
an airfoil including a trailing edge and a support that defines a leading edge, said airfoil adapted for pivotal movement about a pivot axis extending through said support and said airfoil adapted for movement of the leading edge of the airfoil away from said frame;
means for pivoting said airfoil about said pivot axis; and
means for moving said leading edge of said airfoil away from said frame.

21. A flying device comprising:
a frame adapted for supporting a pilot thereon;
an airfoil including a leading edge region and a trailing edge region, said airfoil adapted for pivotal movement about a pivot axis extending through said leading edge region and said airfoil adapted for movement of the leading edge region of the airfoil away from said frame;
means for pivoting said airfoil about said pivot axis; and
means for moving said leading edge region of said airfoil away from said frame.

* * * * *